United States Patent
Hsu et al.

(10) Patent No.: US 9,043,528 B2
(45) Date of Patent: May 26, 2015

(54) BRIDGE BETWEEN A PERIPHERAL COMPONENT INTERCONNECT EXPRESS INTERFACE AND A UNIVERSAL SERIAL BUS 3.0 DEVICE

(71) Applicant: Etron Technology, Inc., Hsinchu (TW)

(72) Inventors: Shih-Min Hsu, Taipei (TW); Shao-Hung Chen, New Taipei (TW)

(73) Assignee: Etron Technology, Inc., Hsinchu (TW)

( * ) Notice: Subject to any disclaimer, the term of this patent is extended or adjusted under 35 U.S.C. 154(b) by 303 days.

(21) Appl. No.: 13/693,052

(22) Filed: Dec. 4, 2012

(65) Prior Publication Data

US 2013/0173838 A1  Jul. 4, 2013

(30) Foreign Application Priority Data

Dec. 28, 2011  (CN) .................. 2011 2 0577129 U (51) Int. Cl.
| | | |
|---|---|---|
| G06F 13/36 | (2006.01) | |
| G06F 13/42 | (2006.01) | |
| G06F 13/40 | (2006.01) | |

(52) U.S. Cl.
CPC ........ *G06F 13/4221* (2013.01); *G06F 13/4027* (2013.01)

(58) Field of Classification Search
CPC .................................................. G06F 13/385
USPC .................. 710/305–315, 300–304
See application file for complete search history.

(56) References Cited

U.S. PATENT DOCUMENTS

| 7,174,411 | B1 * | 2/2007 | Ngai .............................. 710/316 |
|---|---|---|---|
| 7,996,596 | B2 * | 8/2011 | Sultenfuss et al. ............ 710/313 |
| 8,516,290 | B1 * | 8/2013 | Thomas ........................ 713/400 |
| 8,706,944 | B2 * | 4/2014 | Song et al. .................... 710/313 |
| 2008/0071963 | A1 * | 3/2008 | Chow et al. ................... 710/313 |
| 2009/0271557 | A1 * | 10/2009 | Hsu .............................. 710/315 |
| 2009/0279889 | A1 * | 11/2009 | Kirkpatrick et al. ............ 398/41 |
| 2011/0040916 | A1 * | 2/2011 | Atherton ....................... 710/300 |
| 2012/0166701 | A1 * | 6/2012 | Oh et al. ....................... 710/315 |
| 2012/0290757 | A1 * | 11/2012 | Cheng et al. .................. 710/301 |
| 2013/0145052 | A1 * | 6/2013 | Aiken et al. ...................... 710/9 |
| 2014/0013024 | A1 * | 1/2014 | Lamm et al. .................. 710/313 |
| 2014/0143450 | A1 * | 5/2014 | Saunders et al. ................. 710/8 |

* cited by examiner

*Primary Examiner* — Raymond Phan
(74) *Attorney, Agent, or Firm* — Winston Hsu; Scott Margo (57) ABSTRACT

A bridge includes a Peripheral Component Interconnect Express interface supporting at least two lanes, an Extensible Host Controller Interface, and a Universal Serial Bus 3.0 root hub. The Peripheral Component Interconnect Express interface is used for coupling to a host. Each lane of the at least two lanes provides a highest data transmission speed. The Extensible Host Controller Interface is coupled to the Peripheral Component Interconnect Express interface for storing data transmitted by the Peripheral Component Interconnect Express interface. The Universal Serial Bus 3.0 root hub includes a first controller and a second controller. The first controller and the second controller are used for controlling data transmission of four ports, and a highest data transmission speed provided by each port of the four ports is not more than the highest data transmission speed provided by the lane.

11 Claims, 8 Drawing Sheets

BRIDGE BETWEEN A PERIPHERAL COMPONENT INTERCONNECT EXPRESS INTERFACE AND A UNIVERSAL SERIAL BUS 3.0 DEVICE

BACKGROUND OF THE INVENTION

1. Field of the Invention

The present invention relates to a bridge between a Peripheral Component Interconnect Express interface and a Universal Serial Bus device, and particularly to a bridge that can be applied between a Peripheral Component Interconnect Express interface and a Universal Serial Bus 3.0 device.

2. Description of the Prior Art

A Peripheral Component Interconnect Express (PCI-E) interface is one kind of Peripheral Component Interconnect (PCI) interface computer bus. The PCI-E interface follows the present PCI programming concepts and communications standards, but is based on a faster serial communication system. In a PCI-E standard, a single lane data transmission speed of PCI-E 1.0 is 2.5 Gbps, but a single lane data transmission speed of PCI-E 2.0 is from 2.5 Gbps up to 5 Gbps. In addition, motherboard slots of the PCI-E 2.0 can be backwards-compatible with interface cards of the PCI-E 1.x, and interface cards of the PCI-E 2.0 can also be backward-compatible with motherboards of the PCI-E 1.x to utilize data transmission speeds provided by the motherboards of the PCI-E 1.x.

The Universal Serial Bus (USB) 3.0 specification is the third version of the USB standard. The USB 3.0 specification can support full-duplex data transmission service, and a data transmission speed of the USB 3.0 specification can be up to 5 Gbps, which is ten times a data transmission speed (480 Mbps) of the USB 2.0 specification, so the USB 3.0 device can significantly reduce time for data transmission and power consumption of data transmission. In addition, the USB 3.0 device can be backwards-compatible with a USB 2.0 device. The USB 3.0 device has 8 inner wires, with wire VBUS and wire GND acting as power supply wires, and the other 3 pairs of wires acting as data transmission wires. In the 3 pairs of wires, two data transmission wires are wires D+, D− compatible with the USB 2.0 specification and another two data transmission wires are wires SSRX, SSTX for the USB 3.0 specification.

In the prior art, the USB 3.0 device can communicate with a PCI-E interface through a port of a bridge. Although the USB 3.0 device can support a 5 Gbps data transmission speed, a data transmission speed of a single lane of the PCI-E interface is also 5 Gbps. Therefore, if the bridge is coupled to more than one USB 3.0 device, a sum of data transmission speeds of all USB 3.0 device coupled to the bridge is limited to 5 Gbps due to the data transmission speed (5 Gbps) of the single lane of the PCI-E interface, resulting in a data transmission speed of each USB 3.0 device being less than 5 Gbps.

SUMMARY OF THE INVENTION

An embodiment provides a bridge between a Peripheral Component Interconnect Express interface and a Universal Serial Bus 3.0 device. The bridge includes a Peripheral Component Interconnect Express interface supporting at least two lanes, an Extensible Host Controller Interface, a Universal Serial Bus 3.0 root hub. The Peripheral Component Interconnect Express interface supporting the at least two lanes is used for coupling to a host, where each lane of the at least two lanes provides a highest data transmission speed. The Extensible Host Controller Interface is coupled to the Peripheral Component Interconnect Express interface for storing data transmitted by the Peripheral Component Interconnect Express interface. The Universal Serial Bus 3.0 root hub includes a first controller and a second controller, where the first controller and the second controller are used for controlling data transmission of four ports, and a highest data transmission speed provided by each port of the four ports is not more than the highest data transmission speed provided by the lane.

The present invention provides a bridge between a Peripheral Component Interconnect Express interface and a Universal Serial Bus 3.0 device. The bridge utilizes a Peripheral Component Interconnect Express interface supporting at least two lanes and a Universal Serial Bus 3.0 root hub including two controllers to let at least one USB 3.0 device coupled to the bridge provide a higher data transmission speed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
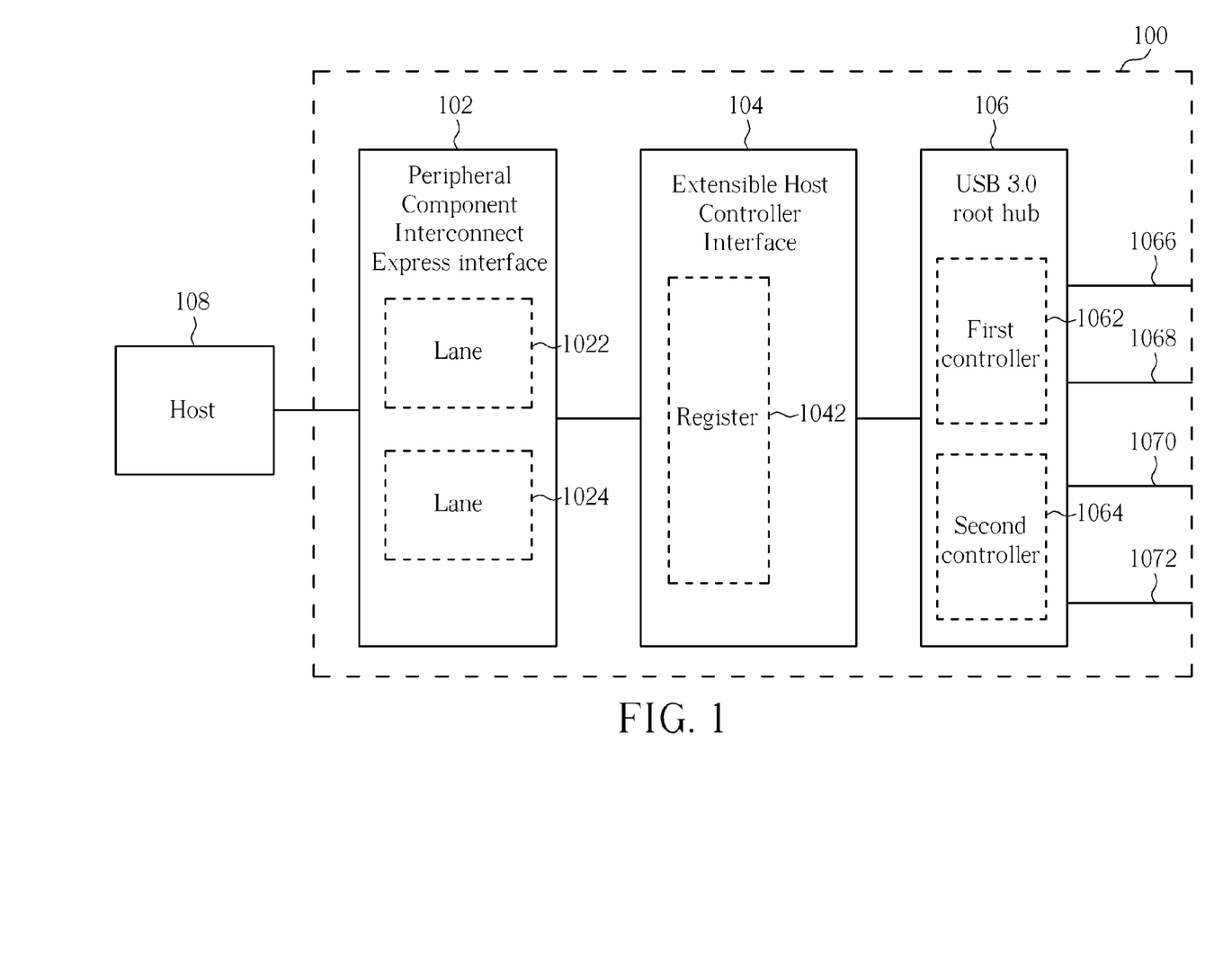
FIG. 1 is a diagram illustrating a bridge between a Peripheral Component Interconnect Express interface and a Universal Serial Bus 3.0 device according to an embodiment.

Please refer to FIG. 1. FIG. 1 is a diagram illustrating a bridge 100 between a Peripheral Component Interconnect Express (PCI-E) interface and a Universal Serial Bus (USB) 3.0 device according to an embodiment. The bridge 100 includes a PCI-E interface 102 supporting two lanes 1022, 1024, an Extensible Host Controller Interface (xHCI) 104, and a USB 3.0 root hub 106. The PCI-E interface 102 is used for coupling to a host 108. Because each lane of the two lanes 1022, 1024 can provide a highest data transmission speed 5 Gbps, the PCI-E interface 102 can provide a highest data transmission speed 10 Gbps. But, the present invention is not limited to the PCI-E interface 102 only supporting the two lanes 1022, 1024. The xHCI 104 is coupled to the PCI-E interface 102. The xHCI 104 includes a register 1042, where the register 1042 is used for storing data transmitted by the PCI-E interface 102 through the two lanes 1022, 1024. The USB 3.0 root hub 106 includes a first controller 1062 and a second controller 1064, where the first controller 1062 and the second controller 1064 are used for controlling data transmission of four ports 1066, 1068, 1070, and 1072, and a highest data transmission speed provided by each port of the four ports 1066, 1068, 1070, and 1072 is not more than the highest data transmission speed (5 GHz) provided by the lanes 1022, 1024. That is to say, the highest data transmission speed provided by each port of the four ports 1066, 1068, 1070, and 1072 is 5 Gbps. But, the present invention is not limited to the PCI-E interface 102 only supporting the two lanes 1022, 1024.

Figure 2A:
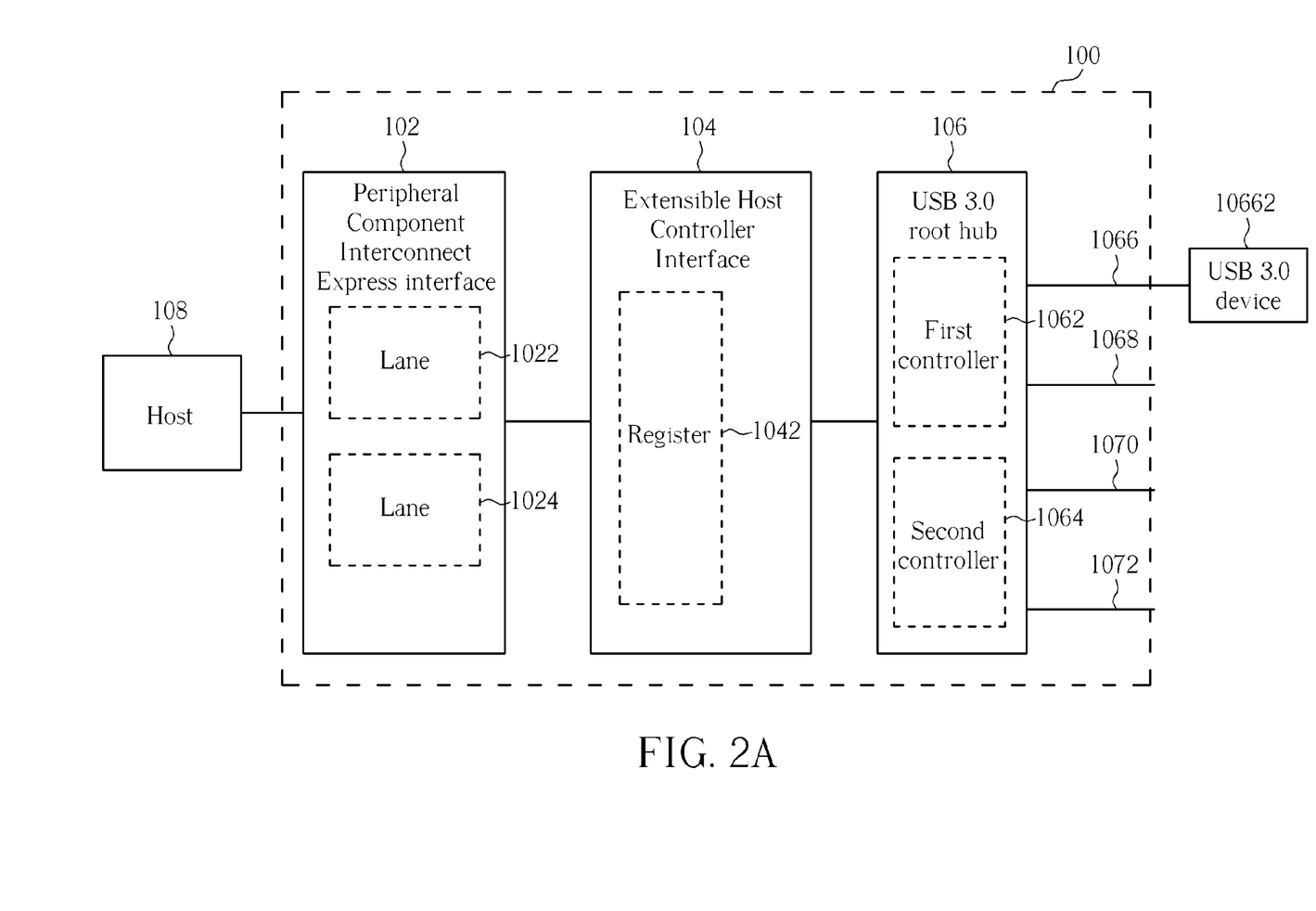
FIG. 2A, FIG. 2B, FIG. 2C, FIG. 2D, and FIG. 2E are diagrams illustrating the four ports being coupled to at least one USB 3.0 device.
Figure 2B:
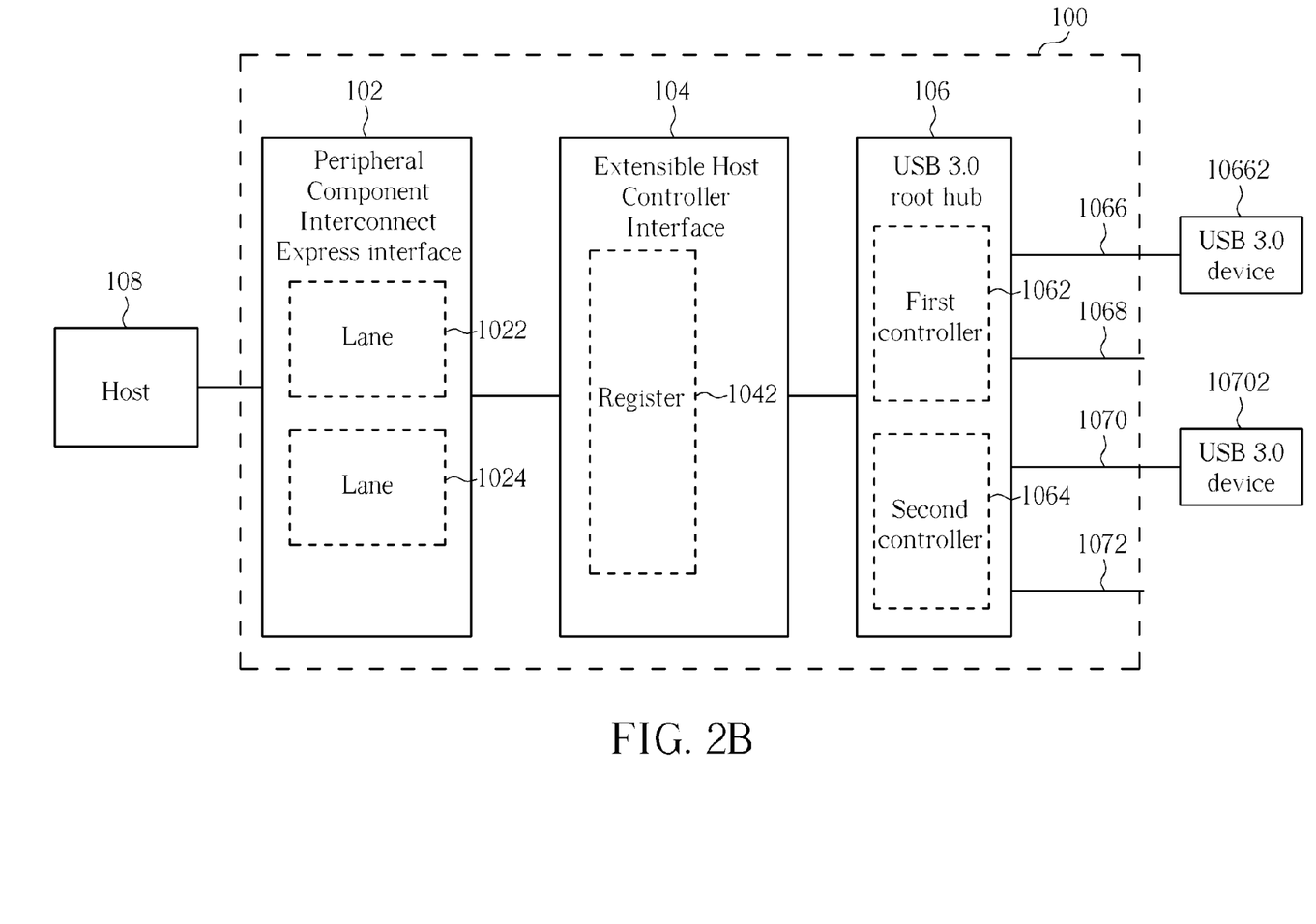
Figure 2C:
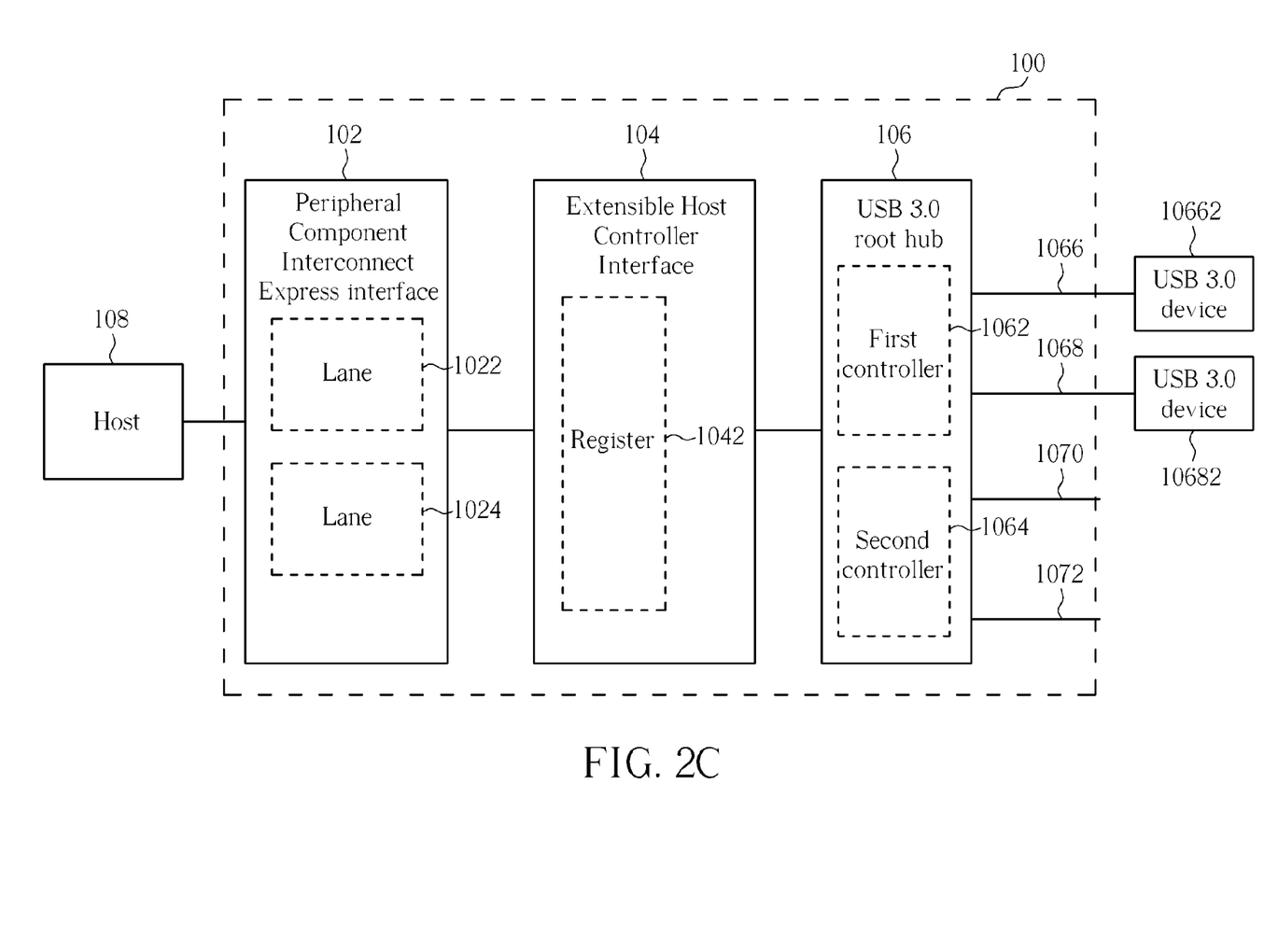
Figure 2D:
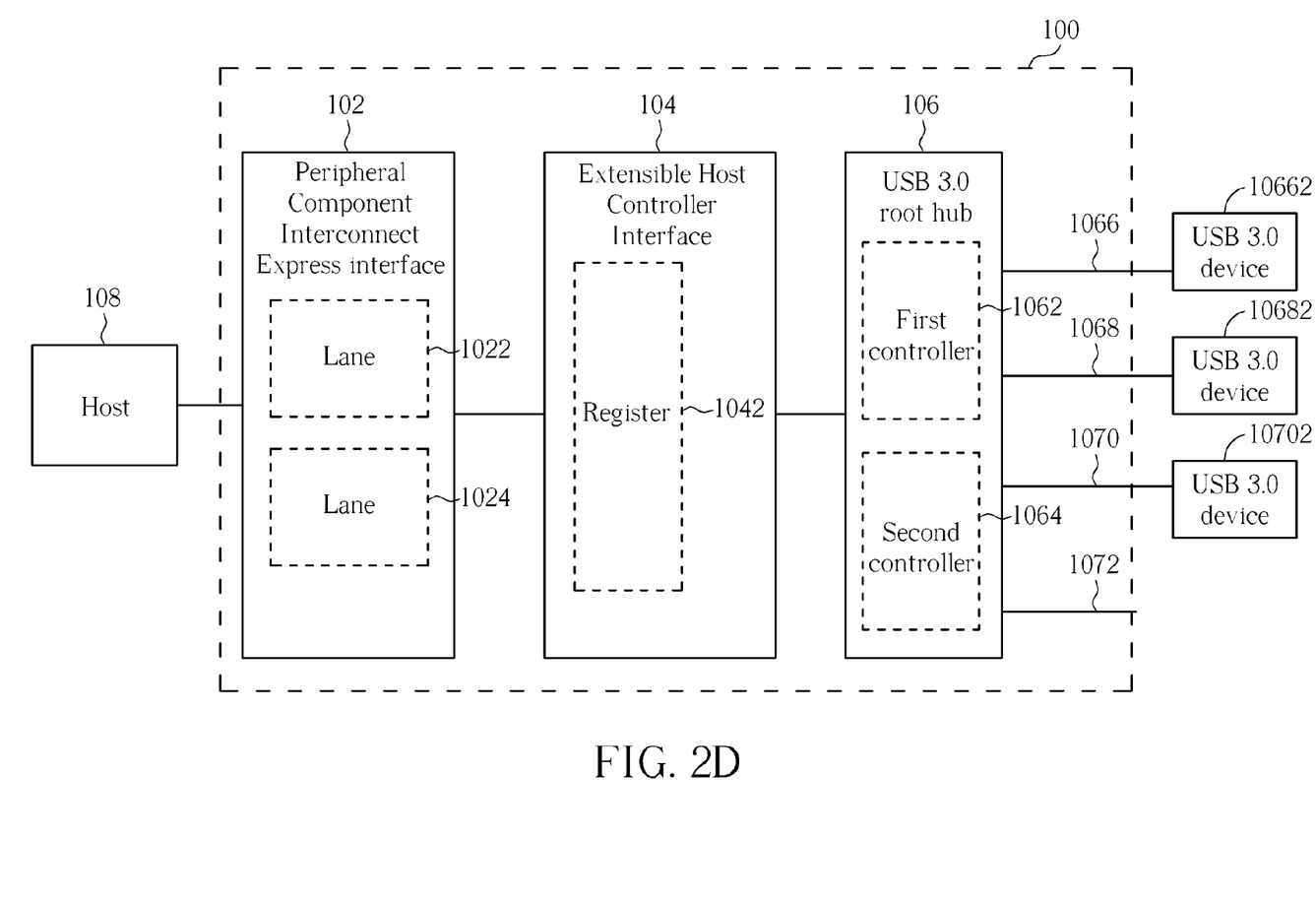
Figure 2E:
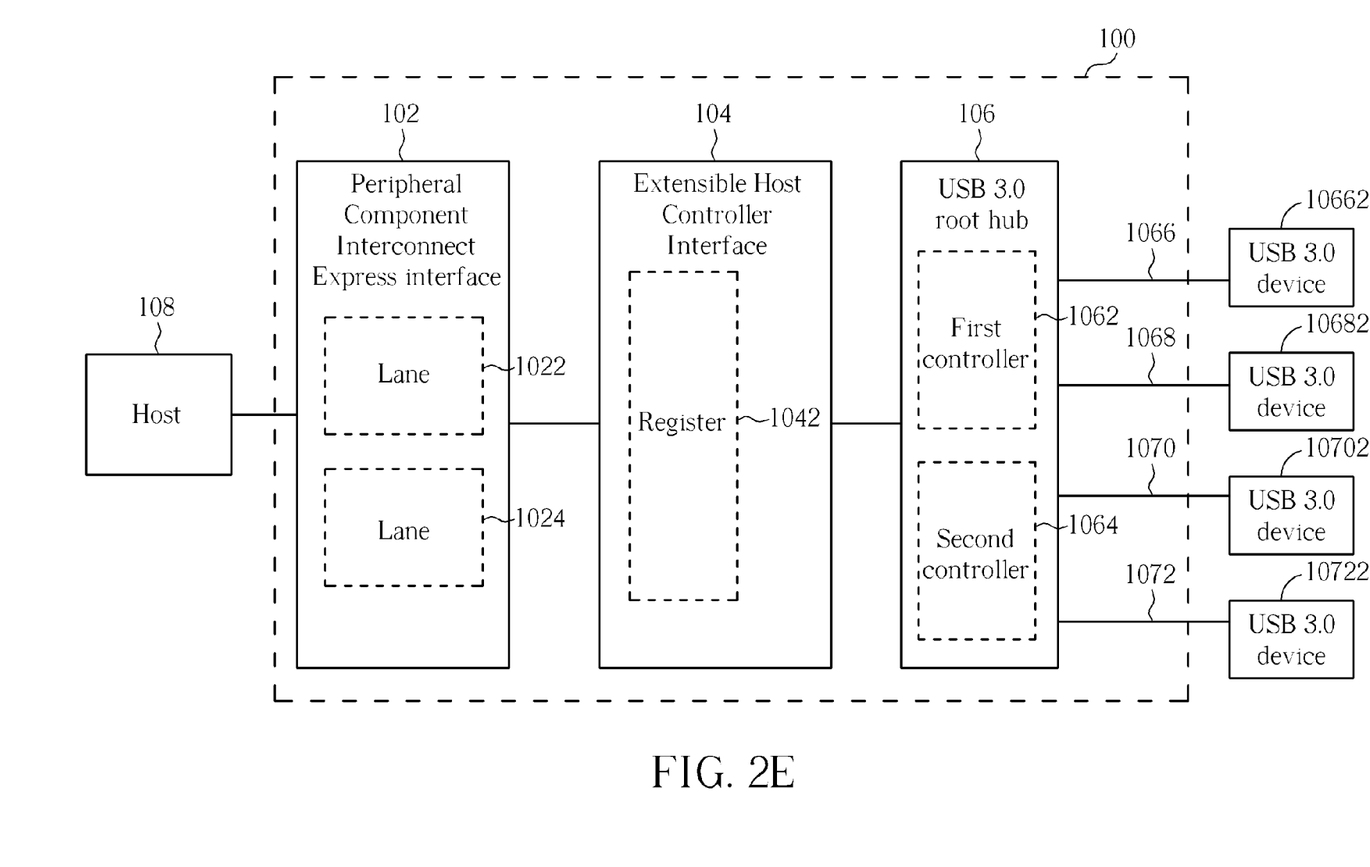

Please refer to FIG. 2A, FIG. 2B, FIG. 2C, FIG. 2D, and FIG. 2E. FIG. 2A, FIG. 2B, FIG. 2C, FIG. 2D, and FIG. 2E are diagrams illustrating the four ports 1066, 1068, 1070, and 1072 being coupled to at least one USB 3.0 device. As shown in FIG. 2A, when the port 1066 is coupled to a USB 3.0 device 10662, a data transmission speed provided by the USB 3.0 device 10662 can be up to 5 Gbps through controlling of the first controller 1062 because the highest data transmission speed (10 Gbps) provided by the PCI-E interface 102 is greater than a highest data transmission speed (5 Gbps) provided by the USB 3.0 device 10662. As shown in FIG. 2B, when the port 1066 is coupled to the USB 3.0 device 10662 and the port 1070 is coupled to a USB 3.0 device 10702, because the highest data transmission speed provided by each port of the two lanes 1022, 1024 is 5 Gbps, both a data transmission speed provided by the USB 3.0 device 10662 and a data transmission speed provided by the USB 3.0 device 10702 can also be up to 5 Gbps through controlling of the first controller 1062 and the second controller 1064. As shown in FIG. 2C, when the port 1066 is coupled to the USB 3.0 device 10662 and the port 1068 is coupled to a USB 3.0 device 10682, because the highest data transmission speed provided by each port of the two lanes 1022, 1024 is 5 Gbps, both a data transmission speed provided by the USB 3.0 device 10662 and a data transmission speed provided by the USB 3.0 device 10682 can also be up to 5 Gbps through controlling of the first controller 1062. As shown in FIG. 2D, when the port 1066 is coupled to the USB 3.0 device 10662, the port 1068 is coupled to the USB 3.0 device 10682, and the port 1070 is coupled to the USB 3.0 device 10702, because the highest data transmission speed provided by each port of the two lanes 1022, 1024 is 5 Gbps, both a data transmission speed provided by the USB 3.0 device 10662 and a data transmission speed provided by the USB 3.0 device 10682 can only be up to 2.5 Gbps through controlling of the first controller 1062, and a data transmission speed provided by the USB 3.0 device 10702 can be up to 5 Gbps through controlling of the second controller 1064. As shown in FIG. 2E, when the port 1066 is coupled to the USB 3.0 device 10662, the port 1068 is coupled to the USB 3.0 device 10682, the port 1070 is coupled to the USB 3.0 device 10702, and the port 1072 is coupled to a USB 3.0 device 10722, because the highest data transmission speed provided by each port of the two lanes 1022, 1024 is 5 Gbps, a data transmission speed provided by the USB 3.0 device 10662, a data transmission speed provided by the USB 3.0 device 10682, a data transmission speed provided by the USB 3.0 device 10702 and a data transmission speed provided by the USB 3.0 device 10722 can only be up to 2.5 Gbps through controlling of the first controller 1062 and the second controller 1064. In addition, FIG. 2A, FIG. 2B, FIG. 2C, FIG. 2D, and FIG. 2E are only used for describing a coupling relationship between the four ports 1066, 1068, 1070, and 1072 and at least one USB 3.0 device. That is to say, a coupling relationship between the four ports 1066, 1068, 1070, and 1072 and at least one USB 3.0 device is not limited to coupling relationships shown in FIG. 2A, FIG. 2B, FIG. 2C, FIG. 2D, and FIG. 2E.

Figure 3:
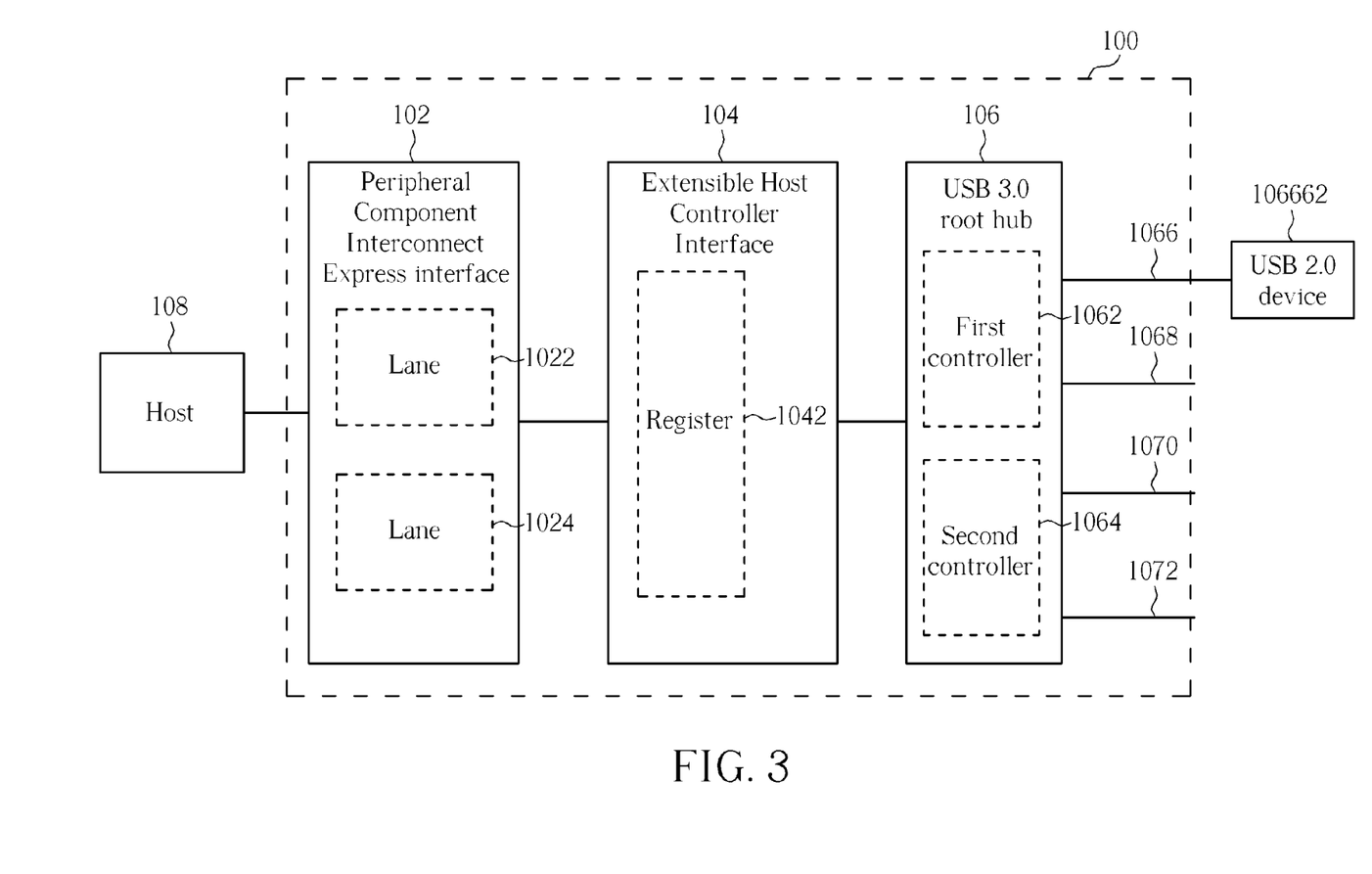
FIG. 3 is a diagram illustrating the four ports being coupled to a USB 2.0 device.

Please refer to FIG. 3. FIG. 3 is a diagram illustrating the four ports 1066, 1068, 1070, and 1072 being coupled to a USB 2.0 device. As shown in FIG. 3, the port 1066 is coupled to a USB 2.0 device 106662. A data transmission speed provided by the USB 2.0 device 106662 can be up to 480 Mbps through controlling of the first controller 1062 because the USB 3.0 root hub 106 also supports a highest data transmission speed (480 Mbps) provided by the USB 2.0 device. In addition, because the highest data transmission speed (480 Mbps) provided by the USB 2.0 device is 480 Mbps, a data transmission speed provided by each USB 2.0 device of the at least one USB 2.0 device can be up to 480 Mbps when the USB 3.0 root hub 106 is coupled to at least one USB 2.0 device through the four ports 1066, 1068, 1070, and 1072.

Figure 4:
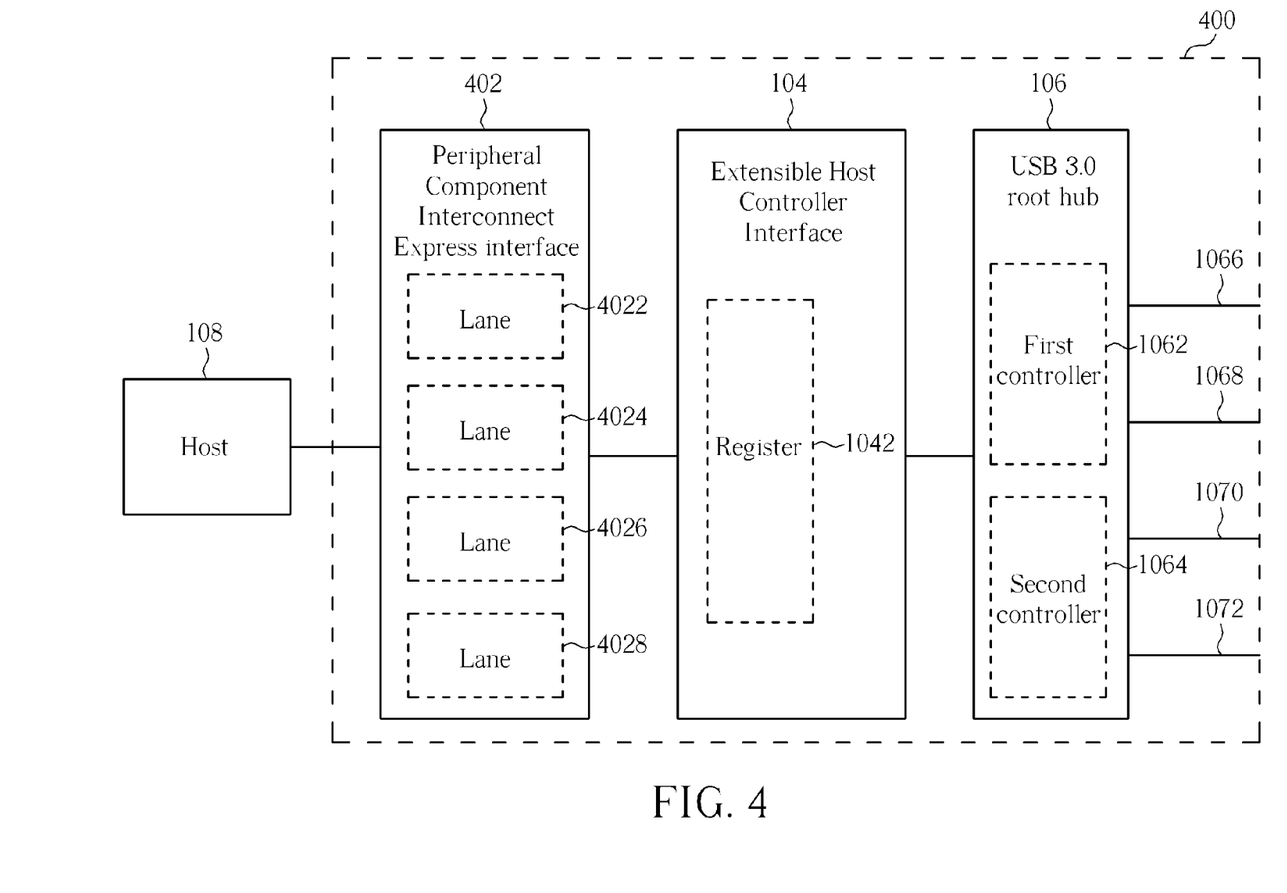
FIG. 4 is a diagram illustrating a bridge between a PCI-E interface and a USB 3.0 device according to another embodiment.

Please refer to FIG. 4. FIG. 4 is a diagram illustrating a bridge 400 between a PCI-E interface and a USB 3.0 device according to another embodiment. A difference between the bridge 400 and the bridge 100 is that a PCI-E interface 402 of the bridge 400 supports 4 lanes 4022, 4024, 4026, and 4028. Because each lane of the 4 lanes 4022, 4024, 4026, and 4028 can provide a highest data transmission speed 5 Gbps, a data transmission speed provided by each USB 3.0 device of at least one USB 3.0 device can also be up to 5 Gbps when the USB 3.0 root hub 106 is coupled to the at least one USB 3.0 device through the four ports 1066, 1068, 1070, and 1072. Further, subsequent operational principles of the bridge 400 are the same as those of the bridge 100, so further description thereof is omitted for simplicity.

In another embodiment of the present invention, the PCI-E interface 402 and the PCI-E interface 102 can support 8 lanes or 16 lanes, so the bridge 100 and the bridge 400 can provide a higher data transmission speed. In addition, a number of controllers of the USB 3.0 root hub 106 in the present invention are not limited to 2. That is to say, in another embodiment of the present invention, the USB 3.0 root hub 106 can include more than two controllers to provide more ports for coupling to USB 2.0 devices or USB 3.0 devices.

To sum up, the bridge between a PCI-E interface and a Universal Serial Bus 3.0 device utilizes the PCI-E interface supporting at least two lanes and the USB 3.0 root hub including at least two controllers to let at least one USB 3.0 device coupled to the bridge provide higher data transmission speed. In the prior art, when two USB 3.0 devices are coupled to a PCI-E interface supporting one lane, a data transmission speed of each USB 3.0 device of the two USB 3.0 devices can only be up to 2.5 Gbps; when four USB 3.0 devices are coupled to a PCI-E interface supporting one lane, a data transmission speed of each USB 3.0 device of the four USB 3.0 devices can only be up to 1.25 Gbps. But, in the present invention, the bridge can support at least 5 Gbps data transmission speed when the bridge is coupled to two USB 3.0 devices, and can support at least 2.5 Gbps data transmission speed when the bridge is coupled to four USB 3.0 devices. Therefore, compared to the prior art, the bridge of the present invention can provide a higher data transmission speed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge between a Peripheral Component Interconnect Express interface and a Universal Serial Bus 3.0 compatible device, the bridge comprising:
   a Peripheral Component Interconnect Express (PCI-E) interface supporting at least two lanes for coupling to a host, wherein each lane of the at least two lanes provides a first highest data transmission speed;
   an Extensible Host Controller Interface (xHCI) coupled to the Peripheral Component Interconnect Express interface for storing data transmitted by the Peripheral Component Interconnect Express interface; and
   a Universal Serial Bus (USB) 3.0 compatible root hub comprising a first controller and a second controller, wherein the first controller and the second controller are used for controlling data transmission of four ports;
   wherein when a sum of at least one second highest data transmission speed provided by at least one USB 3.0 compatible device coupled to the bridge is not greater than a sum of first highest data transmission speeds provided by the at least two lanes, one port of the four ports coupled to one of the at least one USB 3.0 compatible device provides the first highest data transmission speed thereof; and when the sum of the at least one second highest data transmission speed provided by the at least one USB 3.0 compatible device coupled to the bridge is greater than the sum of the first highest data transmission speeds provided by the at least two lanes, a data transmission speed provided by the each port of the four ports is determined by a number of the at least one USB 3.0 compatible device coupled to one of the first controller and the second controller controlling the each port.

2. The bridge of claim 1, wherein the first controller is used for controlling data transmission of two ports of the four ports, and the second controller is used for controlling data transmission of the other two ports of the four ports.

3. The bridge of claim 1, wherein the Extensible Host Controller Interface comprises a register for storing and transmitting data of each lane of the at least two lanes.

4. The bridge of claim 1, wherein the Universal Serial Bus 3.0 compatible root hub supports a data transmission speed of Universal Serial Bus 2.0.

5. The bridge of claim 1, wherein the Peripheral Component Interconnect Express interface supports two lanes.

6. The bridge of claim 1, wherein the Peripheral Component Interconnect Express interface supports four lanes.

7. The bridge of claim 1, wherein the Peripheral Component Interconnect Express interface supports $2^n$ lanes, wherein n≥1 and n is an integer.

8. The bridge of claim 1, wherein the first highest data transmission speed provided by the each lane is 5 Gbps.

9. The bridge of claim 4, wherein a data transmission speed of each port of the four ports is a highest data transmission speed of the Universal Serial Bus 2.0 when the Universal Serial Bus 3.0 compatible root hub supports the data transmission speed of the Universal Serial Bus 2.0.

10. The bridge of claim 9, wherein the highest data transmission speed of the Universal Serial Bus 2.0 is 480 Mbps.

11. A bridge between a Peripheral Component Interconnect Express interface and a Universal Serial Bus 3.0 compatible device, the bridge comprising:
  a PCI-E interface supporting at least two lanes for coupling to a host, wherein each lane of the at least two lanes provides a first highest data transmission speed;
  an xHCI coupled to the Peripheral Component Interconnect Express interface for storing data transmitted by the Peripheral Component Interconnect Express interface; and
  a USB 3.0 compatible root hub comprising a first controller and a second controller, wherein the first controller and the second controller are used for controlling data transmission of four ports;
  wherein in the event only two USB 3.0 compatible devices are coupled to two ports of the bridge respectively, both a first port and a second port of the two ports provide the first highest data transmission speed for the corresponding coupled USB 3.0 compatible device if the first controller is coupled to the first and the second ports, and both the first port and the second port of the two ports provide the first highest data transmission speed for the corresponding coupled USB 3.0 compatible device if the first controller is coupled to the first port and the second controller is coupled to the second port.

* * * * *